US012330005B2

(12) United States Patent
Swierzewski et al.

(10) Patent No.: US 12,330,005 B2
(45) Date of Patent: Jun. 17, 2025

(54) SPRINKLER DEVICE

(71) Applicant: Carrier Corporation, Palm Beach Gardens, FL (US)

(72) Inventors: Sebastian Swierzewski, Gdańsk (PL); Piotr Wolnowski, Gdańsk (PL); Nazar Krutskevych, Gdańsk (PL); Jarmo Helasuo, Vantaa (FI)

(73) Assignee: CARRIER CORPORATION, Palm Beach Gardens, FL (US)

( * ) Notice: Subject to any disclaimer, the term of this patent is extended or adjusted under 35 U.S.C. 154(b) by 558 days.

(21) Appl. No.: 17/590,164

(22) Filed: Feb. 1, 2022

(65) Prior Publication Data

US 2022/0241632 A1 Aug. 4, 2022

(30) Foreign Application Priority Data

Feb. 2, 2021 (EP) .................................... 21154771

(51) Int. Cl.
*A62C 37/14* (2006.01)
*A62C 37/50* (2006.01)

(52) U.S. Cl.
CPC .............. *A62C 37/14* (2013.01); *A62C 37/50* (2013.01)

(58) Field of Classification Search
CPC ......... A62C 37/04; A62C 37/08; A62C 37/10; A62C 37/11; A62C 37/14; A62C 37/50
See application file for complete search history.

(56) References Cited

U.S. PATENT DOCUMENTS 7,633,393 B2 * 12/2009 Bonne .................... A62C 37/50 340/539.22
2018/0050351 A1 * 2/2018 Hall .......................... H04B 7/24
2019/0083833 A1 * 3/2019 Müller .................... A62C 37/04
2019/0247689 A1 * 8/2019 Trivelpiece ........... F16K 37/005
2020/0027646 A1 1/2020 Hamada et al.
2022/0355146 A1 11/2022 Krutskevych et al.

FOREIGN PATENT DOCUMENTS

EP 3597274 A1 1/2020
EP 3623019 A1 * 3/2020 ............. A62C 37/04
EP 3702003 A1 9/2020
EP 3662976 A1 10/2020
EP 3795218 A1 3/2021
WO 2017026659 A1 2/2017

OTHER PUBLICATIONS

European Search Report for Application No. 21154771.6; Issued Jul. 5, 2021; 8 Pages.

* cited by examiner

*Primary Examiner* — Darren W Gorman
(74) *Attorney, Agent, or Firm* — CANTOR COLBURN LLP

(57) ABSTRACT

A sprinkler device 200 for a fire suppression system 10, the sprinkler device 200 including: a sprinkler bulb 100 comprising a first antenna. The sprinkler device 200 also includes a second antenna 220 for communicating with the first antenna of the sprinkler bulb 100, and a base plate 230, wherein the second antenna 220 is disposed within the base plate 230.

15 Claims, 3 Drawing Sheets

SPRINKLER DEVICE

FOREIGN PRIORITY

This application claims priority to European Patent Application No. 21154771.6, filed Feb. 2, 2021, and all the benefits accruing therefrom under 35 U.S.C. § 119, the contents of which in its entirety are herein incorporated by reference.

TECHNICAL FIELD

The disclosure relates to a sprinkler device, and more specifically to a sprinkler device for wirelessly communicating with a sprinkler bulb therein.

BACKGROUND

Fire suppression systems typically include sprinkler devices arranged to expel or disperse fluid for suppressing or preventing fire. Sprinkler devices typically include sprinkler bulbs which are arranged to break at predetermined temperatures indicative of a fire (or indicative of a risk of fire), and thereby cause the sprinkler to emit fire suppression fluid. Sprinkler bulbs therefore operate as a type of mechanical fuse, which release fire suppression fluid from an associated source when they break. In order to function correctly, the bulb of the sprinkler device must reliably break under prearranged circumstances which occur in the event of a fire.

Some fire suppression systems employ sprinkler bulbs that communicate wirelessly with the system. The systems can then obtain limited information from those bulbs, such as whether a sprinkler device with which the bulb is associated has been activated or not. Since sprinkler bulbs are typically small, frangible, single-use components of the fire suppression system, their adaptation faces certain practical limitations of economy and suitability to the system in which they are used. Moreover, the basic functionality of many fire suppression systems is difficult to change, since they are often already installed on site. Improvements to fire suppression systems employing sprinkler bulbs using wireless communication are therefore needed.

SUMMARY

According to a first aspect, there is provided a sprinkler device for a fire suppression system, the sprinkler device comprising: a sprinkler bulb comprising a first antenna; a second antenna for communicating with the first antenna of the sprinkler bulb; and a base plate, wherein the second antenna is disposed within the base plate.

The sprinkler device may therefore be configured such that during use the first antenna of the sprinkler bulb may communicate with the second antenna in the base plate, and vice versa. The second antenna may therefore be operable to receive a signal (e.g. elicit a responsive signal) from first antenna e.g. to confirm the presence of a sprinkler bulb in the sprinkler device, and thereby confirm that the sprinkler device is in a ready state. The second antenna may be operable to elicit (and subsequently detect) a response from the first antenna.

The second antenna in the base plate of the sprinkler device may be controlled by a sprinkler device controller, which sprinkler device controller may be part of the sprinkler device, and/or may be part of a fire suppression system. The controller may be connected (e.g. physically, electronically connected) to a fire suppression system. Thus, the sprinkler device may be operable to communicate with the sprinkler bulb therein, and during use a fire suppression system connected to (and/or comprising) the controller may communicate wirelessly with the sprinkler bulb.

The base plate may be arranged around (and/or provide) an outer perimeter of the sprinkler device. The base plate may be disposed on a surface on which the sprinkler device is installed. For example, if the sprinkler device is installed in a ceiling, the base plate may be provided on the ceiling. The base plate may therefore aid in mounting the sprinkler device to a surface such as a ceiling. Alternatively, the base plate may be decorative and may be provided to cover a part of the surface in which the sprinkler device is located. The base plate may be entirely decorative except for its function of housing the second antenna. The base plate may decorate a surface in which the sprinkler device is provided. The second antenna may be provided inside the base plate e.g. in an enclosure formed thereby. Alternatively, the antenna may be embedded within the base plate.

The base plate may be disposed between the second antenna and the sprinkler bulb. The base plate may therefore be interposed between the first antenna of the sprinkler bulb and the second antenna. Thus, signals between the first antenna and second antenna may need to travel through at least a portion of the base plate. Communication between the second antenna and the first antenna of the sprinkler bulb may therefore be through the base plate, and the base plate may consequently reduce, attenuate, or interfere with signals between the first antenna and second antenna. The positioning of the second antenna within the base plate may therefore be a compromise between proximity to the first antenna, and functionality in view of a weakened signal.

The base plate may also be arranged to protect the second antenna e.g. from extreme conditions like high temperatures resulting from a fire event. The second antenna may therefore be safe from damage in the event of fire that might otherwise cause it damage. Therefore, in the event of a fire that causes the sprinkler to activate, only the sprinkler bulb may need to be replaced, and second antenna may not need to be replaced.

The sprinkler bulb may comprise a sealed, frangible housing, and the housing may contain a fluid. The sprinkler bulb may be configured so that the housing breaks when the fluid reaches a predetermined temperature, or when it is subject to a predetermined pressure from the fluid. Thus, the sprinkler bulb may be suitable for use in a conventional sprinkler device and/or fire suppression system or the like. The sprinkler may be operable as a conventional sprinkler bulb. The sprinkler bulb may be arranged so that the housing cracks, bursts, shatters or otherwise breaks under predetermined conditions, for example predetermined conditions indicative of a fire event (e.g. when subject to a predetermined temperature), so that the sprinkler bulb may be used for activating the sprinkler device and/or a fire suppression system when the predetermined conditions are met. The sprinkler bulb may be suitable for preventing release of a fire suppressant or the like from the sprinkler device unless it breaks. For example, the sprinkler bulb may be configured to break, shatter or burst, when its temperature reaches a predetermined threshold. The sprinkler bulb may be arranged so that when it is intact it may support a predetermined mechanical load, e.g. for holding a seal or plug of the sprinkler device in place to prevent release of fire suppressant.

The sprinkler bulb may comprise a circuit device, and the circuit device may comprise the first antenna of the sprinkler bulb. The circuit device may be (or may include) a radio-frequency identification (RFID) tag, and the first antenna may therefore form part of the RFID tag. The circuit device may be disposed within the fluid in the housing, and may be freely disposed within the fluid. The circuit device may not be attached or otherwise mechanically coupled to the housing. The circuit device may not be tangibly connected to e.g. wires that lead outside the housing. The sprinkler bulb may not comprise any electrical components other than the circuit device. The circuit device may comprise a plurality of electronic components. The circuit device may comprise a printed circuit board or the like. The circuit device may not interfere with or otherwise affect the function of the sprinkler bulb in breaking under predetermined conditions. The circuit device may have no effect on the mechanical properties of the housing. The circuit device may be entirely within the housing, and may be entirely within an opening or chamber within the housing. The circuit device may be moveable within the housing since it may not be attached or otherwise coupled to the housing.

The circuit device may comprise a wireless module for receiving power, and the wireless module may comprise the first antenna. The circuit device may therefore wirelessly receive power from outside the sprinkler bulb. The circuit device may only receive power wirelessly from outside the sprinkler bulb. The sprinkler bulb may therefore be completely sealed and does not require connections, wiring, leads or the like passing into the housing, or embedded in the housing. The wireless module may be configured to receive signals, and the circuit device may be controllable via signals received by the wireless module.

The circuit device may be a passive circuit device and may be passive in the sense that it is not able to operate in isolation (e.g. an RFID tag). It may comprise only passive electronic components. The passive circuit device may itself be incapable of controlling current flow therein. The passive circuit device may be configured only to operate in response to external signals and controls e.g. from the second antenna of the sprinkler device and/or other device such as a sprinkler device controller or a fire suppression system controller.

The wireless module may comprise an inductor and a capacitor. The wireless module may be provided by only the capacitor and the inductor. The inductor and capacitor may be arranged as a resonant circuit, an LC circuit, a tank circuit, a tuned circuit, or the like. The inductor and the capacitor may provide the first antenna. The circuit device may therefore be arranged to be powered via the wireless module, without a tangible, solid connection to anything outside the sprinkler bulb.

The circuit device may comprise a power storage device (e.g. a battery, cell or the like) for storing power received via the wireless module. The circuit device may therefore be charged via the wireless module and/or first antenna. The circuit device may be powered wirelessly e.g. from a fire suppression system or the sprinkler device of a fire suppression system.

The circuit device may comprise a heating element operable to heat the fluid. The circuit device may comprise a heating element for heating the fluid within the housing of the sprinkler bulb. The heating element may be operable to heat the fluid within the housing of the sprinkler bulb to thereby increase pressure within the housing. The heating element may be operable to heat the fluid and thereby increase pressure in the housing of the sprinkler bulb and cause the housing to break. The sprinkler bulb may therefore be activated on demand e.g. pre-emptively in the event that a fire is detected by other means.

The circuit device many comprise a control unit configured to control the circuit device and the components thereof. The circuit device may be operable to activate components of the circuit device as needed.

Although the circuit device may comprise multiple components, and may be located within the fluid in the housing of the sprinkler bulb, the circuit device may also be only an RFID tag. The RFID tag may be embedded within the bulb, e.g. embedded within the housing of the bulb. That is, the circuit device may not comprise components beyond those required to function as an RFID tag, and may be embedded within the housing of the sprinkler bulb e.g. so that the RFID would not respond to a signal in the event that the sprinkler bulb breaks. The circuit device may comprise a microchip and the microchip may be connected to the first antenna. The first antenna itself may be embedded within the housing of the bulb. The microchip may be embedded within the housing of the bulb. The first antenna may extend between opposing axial ends of the sprinkler bulb, and the microchip may be disposed between the ends of the bulb. The first antenna may include a first portion and a second portion. The first portion may extend between the microchip and a first end of the housing of the sprinkler bulb, and the second portion may extend between the microchip and a second end of the housing of the sprinkler bulb. The first portion of the first antenna and the second portion of the first antenna may each comprise a periodic waveform pattern, each periodic waveform pattern propagating toward respective axial ends of the sprinkler bulb from the microchip. The periodic waveform pattern may be a square waveform. The first antenna may be any suitable shape and take any suitable form.

The second antenna may be a coil antenna. The second antenna may have any suitable shape and may be disposed all about the sprinkler device. That is, the second antenna may surround a central axis of the sprinkler device.

The base plate may have a substantially circular shape, and the second antenna may therefore be compactly arranged within the base plate. Thus, the strength of the signal output by the second antenna may be maximised with respect to the shape of the base plate and the space available for the second antenna. Further, the arrangement recited herein permits existing fire suppression systems to be retrofit with sprinkler devices according to the present invention e.g. by addition of a base plate and second antenna to an existing sprinkler device.

The sprinkler bulb may be coaxial with the second antenna. For example, the second antenna may be a coil antenna and the sprinkler bulb may be arranged coaxially with the coil antenna. The second antenna may be located around the sprinkler bulb on all sides. The second antenna may therefore be arranged so that the sprinkler bulb is located at a position where the strength of the signal from the second antenna is strongest.

The base plate may be formed of metal, heat resistant polymer, glass, and/or composite. Sprinkler devices are typically formed of metal such as stainless steel or other materials which are sufficiently robust and heat resistant to be reliable for use in sprinkler devices. However, such robust materials also typically block or interfere with electromagnetic waves, posing difficulties for wireless communication with a sprinkler bulb in the sprinkler device. This may particularly be the case when the sprinkler device is mounted to a surface such as a ceiling so that the sprinkler bulb is obscured by a majority (e.g. a body) of the sprinkler device (e.g. from components installed behind the ceiling). Moreover, the sprinkler bulb is relatively small and outputs a limited signal strength to be detected by the second antenna. Reliable detection of the sprinkler bulb by the sprinkler device can therefore be difficult.

The base plate may interfere with wireless communication between the first antenna and the second antenna. The base plate may attenuate electromagnetic waves passing through it. However, the base plate may be sufficiently close to the sprinkler bulb so that the second antenna can still reliably communicate with the sprinkler bulb despite the base plate. The base plate may therefore be sufficiently robust and protective, despite the resulting impediment to communication between the second antenna and first antenna of the sprinkler bulb, because the provision of the base plate allows the second antenna to be large enough, and close enough to the sprinkler bulb. The base plate may be made of any suitable material. The base plate may be formed of stainless steel.

The sprinkler device may comprise a flux concentrator arranged to concentrate flux from the second antenna at the sprinkler bulb. The flux concentrator may therefore increase the strength of the signal from the second antenna at the sprinkler bulb. The flux concentrator may concentrate flux from the first antenna of the sprinkler bulb at the second antenna, thereby increasing the strength of the signal from the first antenna at the second antenna.

The flux concentrator may be arranged to prevent parasitic loss of the signal from the second antenna to other components of the sprinkler device e.g. a housing and/or mount, which may be formed of metal in order to be sufficiently robust and heat-safe in the event of a fire.

The flux concentrator may be disposed on an opposite side of the second antenna to the sprinkler bulb. The flux concentrator may be configured to reflect electromagnetic signals e.g. from the second antenna towards the sprinkler bulb and/or from the sprinkler bulb towards the second antenna. The flux concentrator may be installed within the base plate.

The sprinkler device may comprise a fluid inlet for fire suppression fluid, and the second antenna may be disposed around the fluid inlet. The second antenna may therefore be arranged so that in use fire suppression fluid travels through the second antenna as it is dispensed from the sprinkler device. The provision of the second antenna therefore may not interfere with the safety critical functionality of the sprinkler device in dispersing fire suppression fluid.

The first antenna of the sprinkler bulb may be an RFID tag embedded within a housing of the sprinkler bulb.

The second antenna may be configured to use signals in the frequency range of 100 kHz to 160 kHz. The second antenna may be configured to used signals with any suitable frequency, but may be configured to use short-range, low-frequency signals e.g. between 120 kHz to 150 kHz, or between 125 kHz to 148.5 kHz, or between 125 kHz to 134.2 kHz, or 140 kHz to 148.5 kHz. The first antenna may be configured similarly to the second antenna. The sprinkler device may therefore operation in a short-range, low frequency RFID band.

The sprinkler device may comprise a mounting adapter arranged to mount the sprinkler device to a surface. The sprinkler device may comprise a sprinkler body mounted to the surface by the mounting adapter. The sprinkler body may hold the sprinkler bulb and a seal for preventing dispersion of fire suppressant while the sprinkler bulb is intact.

The sprinkler device may be configured to detect pressure changes inside the sprinkler bulb via the first antenna and the second antenna. The sprinkler device may therefore be used for sprinkler bulb crack detection. The sprinkler bulb may comprise a circuit device as described herein (e.g. a passive circuit device), and the circuit device may comprise a wireless module. The wireless module may comprise an inductor and a capacitor having a capacitance sensitive to pressure changes within the housing of the sprinkler bulb. The sprinkler device (e.g. a controller thereof) may be configured to monitor changes in a resonant frequency of the wireless module caused by changes in the capacitance of the capacitor to thereby detect pressure changes inside the housing of the sprinkler bulb.

The wireless module may be provided by only the capacitor and the inductor (e.g. so that the capacitor and inductor provide the first antenna). The inductor and capacitor may be arranged as a resonant circuit, an LC circuit, a tank circuit, a tuned circuit, or the like. The wireless module may therefore have a resonant frequency determined by the characteristics of the inductor and the capacitor. The resonant frequency may be determined the inductance of the inductor and the capacitance of the capacitor. However, pressure changes within the housing may affect the structure and dimensions of the capacitor and may thereby cause its capacitance to change. That is, the capacitor may deform under pressure and that deformation may affect its capacitance e.g. by reducing spacing between its conductive elements. Therefore changes in the capacitance of the capacitor may be indicative of pressure changes within the housing e.g. of the fluid contained in the housing. Moreover, a change in the capacitance of the capacitor will cause a change in the resonant frequency of the wireless module. The change in resonant frequency may be proportional to pressure changes in the sprinkler bulb. The sprinkler device may therefore be configured to monitor and/or track changes in the resonant frequency of the wireless module and thereby detect changes in pressure within the sprinkler bulb. Thus, the first antenna (e.g. the capacitor and/or wireless module) may be arranged in the sprinkler device for use as a pressure sensor.

Therefore, during use, pressure changes within the housing of the sprinkler bulb will cause changes in the capacitance of the capacitor, which in turn will cause changes in the resonant frequency of the wireless unit. The sprinkler device will detect and monitor those changes in the resonant frequency and correlate those changes with pressure changes within the housing of the sprinkler bulb. The sprinkler device may therefore be operable to measure pressure within the sprinkler bulb.

The sprinkler device may comprise a resonance tracking module configured to track changes in the resonant frequency of the wireless module. The circuit device therefore does not need to be a digital device and does not need to comprise a controller, a microprocessor, or the like (i.e. it may be passive). The second antenna of the sprinkler device may send signals to the wireless module of the passive circuit device and/or may receive signals from the wireless module of the passive circuit device. The wireless module may be configured to react to signals from the second antenna of the sprinkler device and the sprinkler device may be configured to detect that reaction.

The capacitor may be any suitable capacitor capable of changing its capacitance in response to changes in ambient pressure. The capacitor may comprise a plurality of conductive layers separated by a predetermined distance, and the capacitor may be arranged to deform under pressure so that the predetermined distance changes. The capacitor may be a standard capacitor, and fundamentally may comprise at least two electrodes held spatially separated from one another. Changes in the predetermined distance between the layers of the capacitor may result in changes of its capacitance. The predetermined distance between layers of the capacitor may be reduced with increasing pressure, and/or may be increased with reducing pressure. The conductive layers may have any topography and may be substantially planar and the predetermined distance between adjacent layers may be substantially constant e.g. at ambient or atmospheric pressure. That is, the conductive layers may be substantially parallel to one another.

The capacitor may take any form so long as its capacitance detectably changes with pressure. The capacitor may be a simple, plain, or common capacitor. That is, the capacitor may not be specifically adapted for use as anything other than a simple capacitor. The capacitor may be suitable for use in a resonant circuit and may not be specifically adapted for use as a pressure sensor. The capacitor may be manufactured and intended for use only as a capacitor. The capacitor may not have a fluid chamber, a diaphragm, or any other cavity or hollow volume for containing fluid. Therefore, the circuit device may be arranged to detect pressure changes within the housing of the sprinkler bulb without the need for specially adapted pressure sensing components. Alternatively, the capacitor may be specially designed for use inside a sprinkler bulb and for use with the devices and methods described herein. The inductor may be any suitable inductor for use in a resonant circuit inside a sprinkler bulb.

The sprinkler device may be arranged to wirelessly provide power to the passive circuit device via the second antenna and the first antenna (e.g. the wireless module of the sprinkler device). The passive circuit device may be arranged such that all power used thereby is received via the first antenna. The passive circuit device may not comprise a battery or other power storage device (e.g. other than the capacitor), and may not be capable of powering itself in the absence of external input. Alternatively, the circuit device may comprise a power storage component for storing energy received by the first antenna.

The passive circuit device may comprise a heating element for heating fluid within the housing of the sprinkler bulb. The heating element may be operable to heat fluid within the housing of the sprinkler bulb to thereby increase pressure within the housing. Such increases in pressure may cause the capacitance of the capacitor to change, thereby also changing the resonant frequency of the wireless module. The sprinkler device may therefore be configured to test the sprinkler bulb integrity using a method of testing integrity of the sprinkler bulb. The method may comprise monitoring a pressure change within the sprinkler bulb via the wireless module of the circuit device inside the sealed frangible housing of the sprinkler bulb; and determining that the sprinkler bulb is in working order if the pressure reaches a predetermined threshold; or determining that the sprinkler bulb is not in working order if the pressure does not reach the predetermined threshold. Monitoring the pressure change within the sprinkler bulb may comprise monitoring a change in the resonant frequency of the wireless module caused by a change in the capacitance of the capacitor of the wireless module, and may comprise determining the pressure change based upon the change in the resonant frequency. The method may comprise associating a change in the resonant frequency of the wireless module with a change in pressure within the housing of the sprinkler bulb. The method may comprise correlating the change in the resonant frequency with the change in pressure. The change in the capacitance of the capacitor may be caused by a change in pressure within the housing of the sprinkler bulb. The method may therefore comprise determining the integrity of the sprinkler bulb based upon whether or not a resonant frequency of the wireless module changes by more than a predetermined amount. The method may comprise measuring pressure within the sprinkler bulb based upon the resonant frequency. The method may comprise correlating resonant frequencies of the wireless module with pressures inside the sprinkler bulb.

The circuit device may be arranged so that the heating element is activated only upon fulfilment of predetermined conditions e.g. only if a signal received by the wireless module has an amplitude greater than a predetermined threshold. The sprinkler device may therefore be arranged so that the heating element can be activated only when needed by sending a signal to the wireless module e.g. having a large enough amplitude. The circuit device may be configured so that the heating element is not activated if the signal received by the wireless module has an amplitude less than the predetermined threshold. The sprinkler device may therefore be arranged with an architecture for isolating the resonant circuit spectral parameters from undesirable influence by the heating element load by using circuitry arranged to dynamically connect the heating element depending on signal amplitude using only passive electronic components. The sprinkler device may therefore be able to detect that a sprinkler bulb is present, e.g. by eliciting a reaction from the wireless module, without the need to active the heating element.

For example, the passive circuit device may comprise a pair of Zener diodes arranged so that the heating element is activated if the wireless module receives a signal with an amplitude greater than the predetermined threshold. The Zener diodes may be arranged as a voltage switch, and may be disposed in series in opposite orientations. Alternatively, the passive circuit device may comprise a DIAC (diode for alternating current) or other suitable component for activating the heating element upon demand.

The sprinkler device may comprise a device controller configured to test integrity of the sprinkler bulb e.g. by checking for cracks etc. in the housing that would prevent pressure therein reaching a level sufficient to cause the housing to break and thereby activate the sprinkler device. The device controller may not be part of the sprinkler bulb. To test the integrity of the sprinkler bulb, the device controller may send a signal from the second antenna to the first antenna of the circuit device. The circuit device may activate the heating element in response to that signal (e.g. if the signal has a sufficiently large amplitude) and thereby cause pressure within the housing of the sprinkler bulb to increase. The device controller may track resulting changes in the resonant frequency of the wireless module of the passive circuit device. The controller may then correlate a frequency change with a change in pressure, or may correlate a given resonant frequency with a given pressure inside the sprinkler bulb. If the pressure in the sprinkler bulb reaches a predetermined threshold (e.g. slightly less than is needed to break the sprinkler bulb) the device controller may determine that the sprinkler bulb is capable of reaching the pressure needed to break in the event of a fire and hence that the sprinkler bulb is in working order and free of cracks or other flaws that might prevent it actuating in the event of a fire. However, if the pressure does not reach a predetermined threshold, that may be indicative of a flaw in the housing—e.g. a crack or micro crack—preventing the pressure reaching a level necessary for the sprinkler bulb to operate. In that case, the device controller may determine that the sprinkler bulb is not in working order. The sprinkler bulb may therefore be replaced to maintain safety.

The device controller may be configured to regularly test the integrity of the sprinkler bulb, and/or may test the integrity upon command e.g. by a user or another controller such as a fire suppression system controller.

Pressure changes within the sprinkler bulb may be expected to range during use between approximately 0 to 2.5 MPa (0 to 25 bar). The capacitance of the capacitor may vary measurably with the pressure over this range. Therefore the capacitor may be sensitive to pressure changes within the working pressure ranges of the sprinkler bulb.

According to a second aspect of the invention there is provided a fire suppression system comprising a sprinkler device as claimed in any preceding claim.

The sprinkler bulb of the sprinkler device may be arranged to prevent fire suppression fluid from being dispersed from the sprinkler device, and the sprinkler device may be arranged so that upon mechanical failure of the sprinkler bulb fire suppression fluid is released for suppression of a fire. In this regard the sprinkler bulb and sprinkler device may be arranged in a conventional manner and may be e.g. installed in a building, aircraft, vehicle, vessel, or other suitable structure where fire suppression capability may be needed. The fire suppression system may be installed in a building, aircraft, vehicle, vessel, or the like.

The sprinkler bulb of the sprinkler device may be arranged in the sprinkler device so that when it is intact it prevents release of fire suppression fluid from the sprinkler device, and when it breaks it causes the fire suppression fluid to be released from the sprinkler device.

The sprinkler device may be arranged to wirelessly provide power to the circuit device of the sprinkler bulb. The sprinkler device may be arranged to power the circuit device via the wireless module. The fire suppression system may not comprise tangible, solid wires (e.g. heating wire filaments or electrical connections for power or signals) connected to and/or embedded in the sprinkler bulb.

The second antenna may be hard-wired into the fire suppression system, and the fire suppression system may thereby be configured to communicate with the first antenna of the sprinkler bulb via the second antenna.

The fire suppression system may comprise a plurality of sprinkler devices, wherein each sprinkler device is as described herein with reference to the first aspect of the invention.

According to a third aspect of the present invention there is provided a method of assembling a sprinkler device of a fire suppression system, the method comprising installing a sprinkler bulb comprising a first antenna, and further comprising installing a second antenna in a base plate of the sprinkler device for communicating with the first antenna. The method may comprise installing a base plate in the sprinkler device.

Installing the second antenna may comprise installing a coil antenna. The method may comprise installing a flux concentrator to concentrate flux from the second antenna at the sprinkler bulb. The method may comprise installing the sprinkler bulb and the second antenna to be coaxial. The method may comprise installing the second antenna about a fluid inlet of the sprinkler device.

The method may comprise configuring the second antenna to use signals in the frequency range of 100 kHz-160 kHz. The method may comprise configuring the sprinkler device to operate in a short-range, low frequency RFID band. Method may comprise configuring the second antenna to used signals e.g. between 120 kHz to 150 kHz, or between 125 kHz to 148.5 kHz, or between 125 kHz to 134.2 kHz, or 140 kHz to 148.5 kHz. The method may comprise configuring the first antenna to operate in the same frequency range as the second antenna. The method may comprise configuring the first and second antennas to communicate with one another.

The method may comprise providing a sprinkler device as recited herein with reference to the first aspect of the invention, and/or providing a fire suppression system as recited herein with reference to the second aspect of the invention.

BRIEF DESCRIPTION OF THE DRAWINGS

Certain embodiments of the present invention are described below by way of example only and with reference to the accompanying drawings, in which.

DETAILED DESCRIPTION OF THE INVENTION

Figure 1:
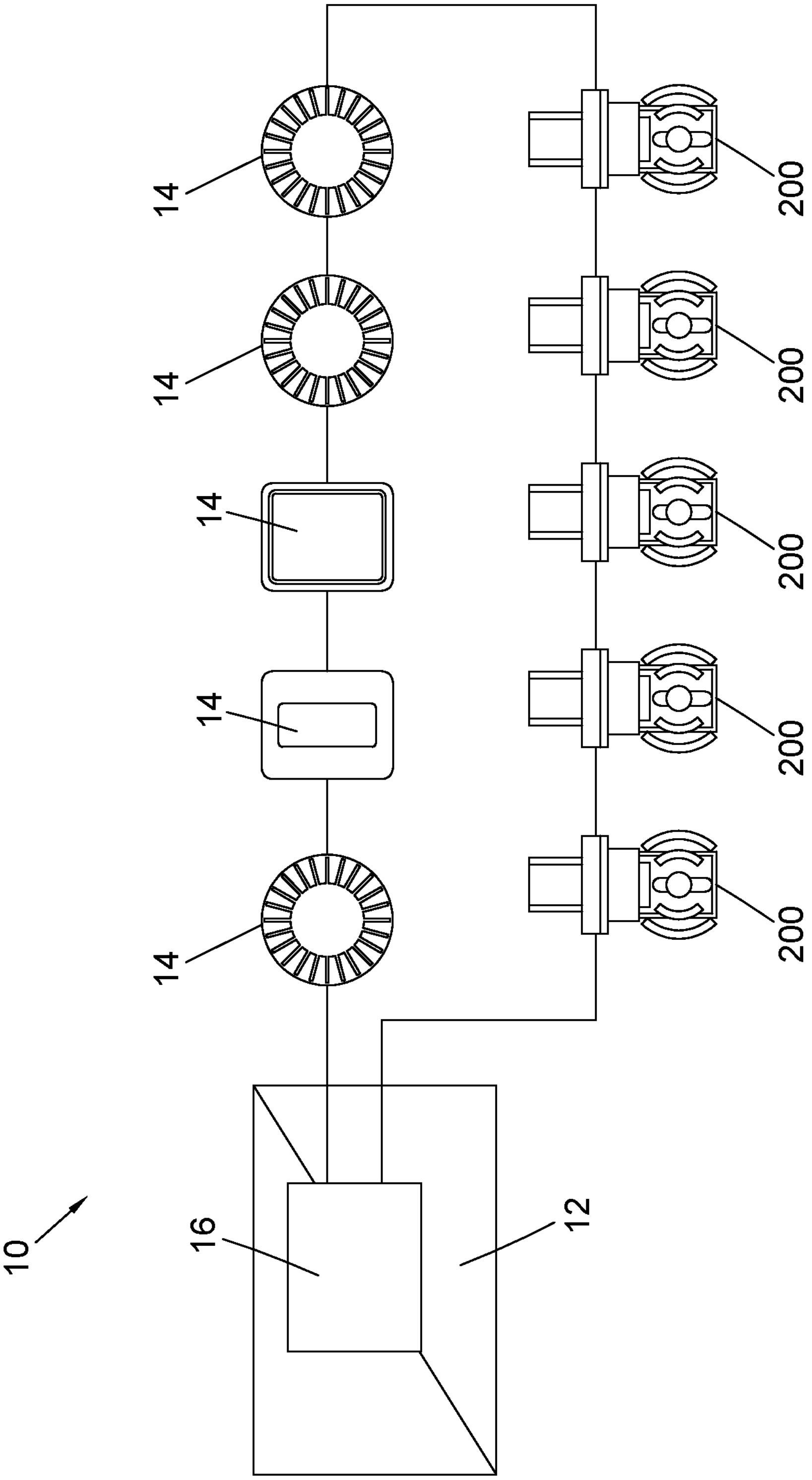
FIG. 1 shows a schematic of a fire suppression system comprising a plurality of sprinkler devices.

FIG. 1 shows a schematic view of a fire suppression system 10 comprising a fire panel 12, a plurality of system components 14 such as smoke detectors, heat detectors, alarms, warning lights, buttons, and so on, and a loop driver 16. The fire suppression system 10 also comprises a plurality of sprinkler devices 200.

Figure 2:
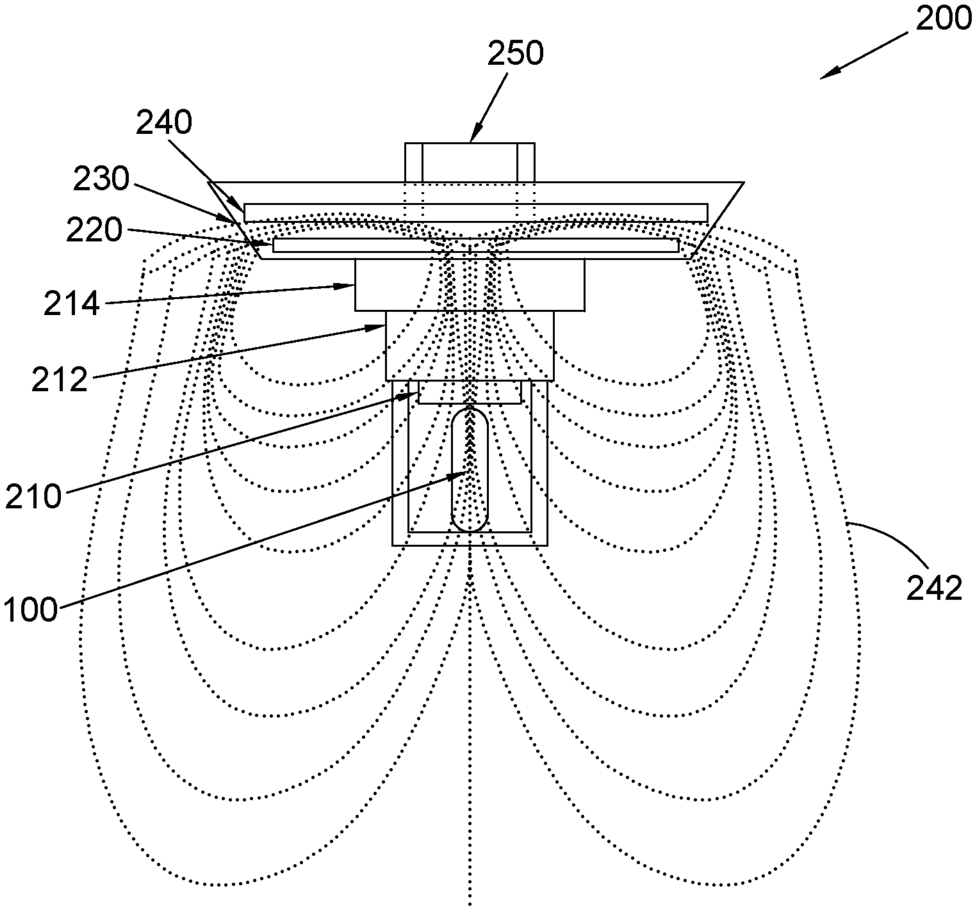
FIG. 2 shows a schematic side view of a sprinkler device of the fire suppression system of FIG. 1.

FIG. 2 shows a sprinkler device 200 of the system of FIG. 1 in more detail. The sprinkler device comprises a frangible sprinkler bulb 100 arranged to maintain a seal 210 in a sealing position in a sprinkler body 212 while the sprinkler bulb 100 is intact. In the event of a fire near the sprinkler device 200, the fluid in the sprinkler bulb 100 is heated until pressure breaks the sprinkler bulb 100 and allows the seal 210 to move out of sealing engagement with the sprinkler body 212, thereby permitting fire suppression fluid (e.g. water) to be released from the sprinkler device 200 e.g. via a fluid inlet 250.

The sprinkler bulb 100 is held in the sprinkler device 200 by the sprinkler body 212. The sprinkler body 212 is mounted by a sprinkler mounting adapter 214 so as to receive fire suppression fluid from the fluid inlet 250. A base plate 230 is provided at the base of the sprinkler device 200, and a coil antenna 220 is located inside the base plate 230 together with a flux concentrator 240 adjacent the coil antenna 220. The base plate 230 extends radially outward from a central axis of the sprinkler device 200. The base plate 230 is wider than the sprinkler body 212 and/or the mounting adapter 214, and the coil antenna 220 is therefore also wider than the sprinkler body 212 and the mounting adapter 214.

Flux 242 from the coil antenna 220 is shown schematically in FIG. 2 by the dashed lines. The flux concentrator 240 is immediately adjacent coil antenna 220 and reflects flux 242 from one side of the coil antenna 220, thereby concentrating flux 242 at the sprinkler bulb 100. The flux concentrator 240 thereby prevents (or at least reduces) parasitic loss of the signal from the coil antenna 220 to components of the sprinkler device 200.

The sprinkler bulb 100 may comprise a radio-frequency identification (RFID) tag which is responsive to the flux 242 from the coil antenna 220, so that the RFID tag of the sprinkler bulb 100 emits a signal that is detected by the coil antenna 220. The coil antenna 220 and sprinkler bulb 100 therefore communicate during use. In particular, the coil antenna 220 is operable to detect the presence of the sprinkler bulb 100, and may also detect other data from the sprinkler bulb 100 e.g. an identification number, status, temperature, pressure and so on, depending on what sort of sprinkler bulb 100 is used.

The sprinkler bulb 100 may comprise a circuit device comprising various electronic components and/or sensors, or it may comprise only the RFID tag. When the sprinkler bulb 100 comprises a circuit device, the first antenna may be provided by a wireless module of the circuit device, which wireless module comprises a capacitor and an inductor. The sprinkler device may be configured to monitor pressure within the sprinkler bulb by detecting changes in a resonant frequency of the wireless module caused by changes in the capacitance of the capacitor as a result of pressure changes in the sprinkler bulb 100.

The flux concentrator 240 also helps concentrate flux from the sprinkler bulb 100 at the coil antenna 220, and thereby improves communication between the coil antenna 220 and the sprinkler bulb 100. Since the sprinkler bulb 100 is relatively small and at least partially enclosed by the sprinkler body 212, the signal from the sprinkler bulb 100 may be relatively weak and may not be detectable by the coil antenna 220 without provision of the flux concentrator 240.

Figure 3:
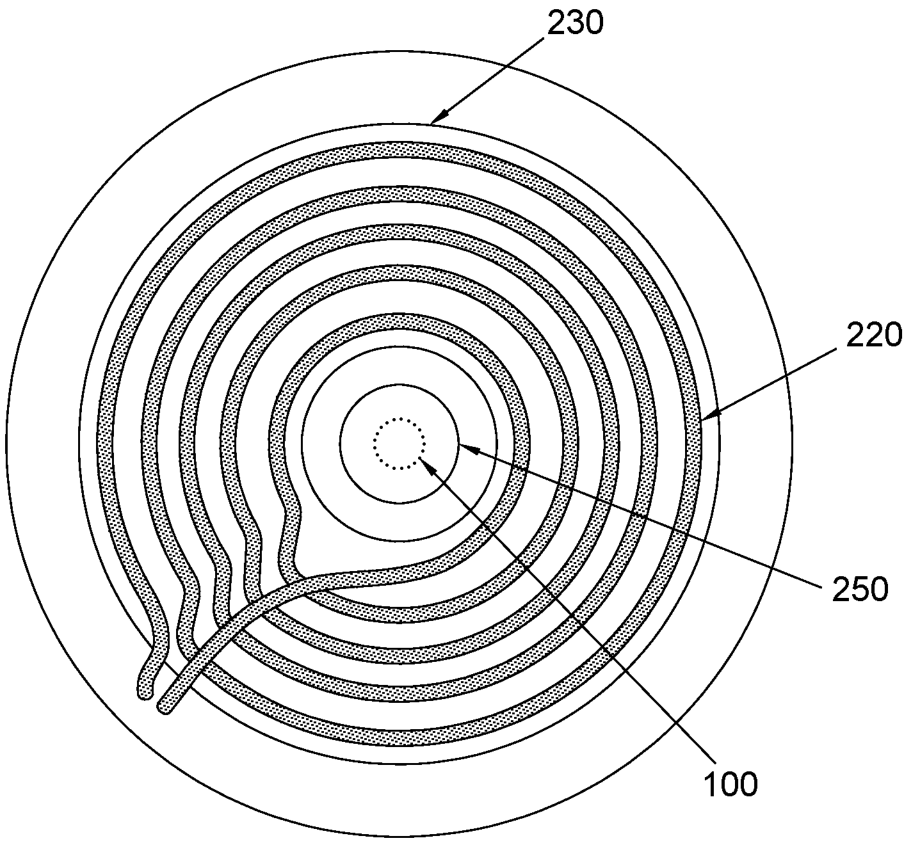
FIG. 3 shows a schematic plan view of the sprinkler device of FIG. 2.

FIG. 3 shows a partially transparent schematic of the sprinkler device 200 of FIG. 2 from below. The coil antenna 220 is disposed inside the base plate 230, and is disposed around the fluid inlet 250. The coil antenna 220 therefore does not interfere with the release of fire suppressant from the sprinkler device 200. The sprinkler bulb 100 is positioned coaxially with the coil antenna 220, and is thereby located at a position of relatively high signal strength from the coil antenna 220. The size and position of the coil antenna 220 therefore ensures reliable communication between the second antenna and the sprinkler bulb 100.

The provision of the base plate 230 also allows the coil antenna 220 to be large enough, and close enough to the sprinkler bulb 100 to ensure reliable communication therebetween. The base plate 230 also protects the coil antenna 220 in the event of a fire, so that the coil antenna 220 does not need to be replaced in after a fire event. Instead, only the sprinkler bulb 100 may need to be replaced.

What is claimed is:

1. A sprinkler device for a fire suppression system, the sprinkler device comprising:
- a sprinkler bulb comprising a first antenna;
- a second antenna for communicating with the first antenna of the sprinkler bulb; and
- a base plate, wherein the second antenna is disposed within the base plate.

2. A sprinkler device as claimed in claim 1, wherein the second antenna is a coil antenna.

3. A sprinkler device as claimed in claim 1, wherein the sprinkler bulb is coaxial with the second antenna.

4. A sprinkler device as claimed in claim 1, wherein the base plate is formed of metal, heat resistant polymer, glass, and/or composite.

5. A sprinkler device as claimed in claim 1, comprising a flux concentrator arranged to concentrate flux from the second antenna at the sprinkler bulb.

6. A sprinkler device as claimed in claim 1, wherein the sprinkler device comprises a fluid inlet for fire suppression fluid, and the second antenna is disposed around the fluid inlet.

7. A sprinkler device as claimed in claim 1, wherein the first antenna of the sprinkler bulb is an RFID tag embedded within a housing of the sprinkler bulb.

8. A sprinkler device as claimed in claim 1, wherein the second antenna is configured to use signals in the frequency range of 100 kHz to 160 kHz.

9. A fire suppression system comprising a sprinkler device as claimed in claim 1.

10. A method of assembling a sprinkler device of a fire suppression system, the method comprising installing a sprinkler bulb comprising a first antenna, and further comprising installing a second antenna in a base plate of the sprinkler device for communicating with the first antenna.

11. A method as claimed in claim 10, wherein installing the second antenna comprises installing a coil antenna.

12. A method as claimed in claim 10, comprising installing a flux concentrator to concentrate flux from the second antenna at the sprinkler bulb.

13. A method as claimed in claim 10, comprising installing the sprinkler bulb and the second antenna to be coaxial.

14. A method as claimed in claim 10, comprising installing the second antenna about a fluid inlet of the sprinkler device.

15. A method as claimed in claim 10, comprising configuring the second antenna to use signals in the frequency range of 100 kHz-160 kHz.

* * * * *